(12) United States Patent
Storteig et al.

(10) Patent No.: US 8,100,078 B2
(45) Date of Patent: Jan. 24, 2012

(54) STEERABLE HYDROFOIL

(75) Inventors: Eskild Storteig, Lierskogen (NO); Rune Tønnessen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 1413 days.

(21) Appl. No.: 10/869,466

(22) Filed: Jun. 16, 2004

(65) Prior Publication Data

US 2005/0279268 A1  Dec. 22, 2005

(51) Int. Cl.
*G01V 1/38* (2006.01)

(52) U.S. Cl. .......................................... 114/246; 114/244

(58) Field of Classification Search .................... 367/16, 367/17; 114/244–246
See application file for complete search history.

(56) References Cited

U.S. PATENT DOCUMENTS

| | | | | |
|---|---|---|---|---|
| 2,401,929 | A * | 6/1946 | Hammond, Jr. | 340/850 |
| 3,605,674 | A * | 9/1971 | Weese | 114/245 |
| 4,890,568 | A * | 1/1990 | Dolengowski | 114/246 |
| 5,357,892 | A * | 10/1994 | Vatne et al. | 114/244 |
| 6,267,070 | B1 * | 7/2001 | Russell et al. | 114/244 |
| 6,655,311 | B1 * | 12/2003 | Martin et al. | 114/242 |
| 6,879,542 | B2 * | 4/2005 | Soreau et al. | 367/17 |

FOREIGN PATENT DOCUMENTS

| GB | 2 335 174 A | 9/1999 |
|---|---|---|
| GB | 2 400 662 A | 10/2004 |

OTHER PUBLICATIONS

UK Search Report dated Oct. 28, 2005, for Application No. GB 0511763.5.

* cited by examiner

*Primary Examiner* — Edwin Swinehart

(57) ABSTRACT

The present invention provides a steerable hydrofoil. The apparatus includes at least one steerable hydrofoil panel, at least one body part coupled to the at least one steerable hydrofoil panel to allow the at least one steerable hydrofoil panel to rotate about an axis, and at least one actuator for rotating the at least one steerable hydrofoil panel by a selected angle about the axis.

35 Claims, 6 Drawing Sheets

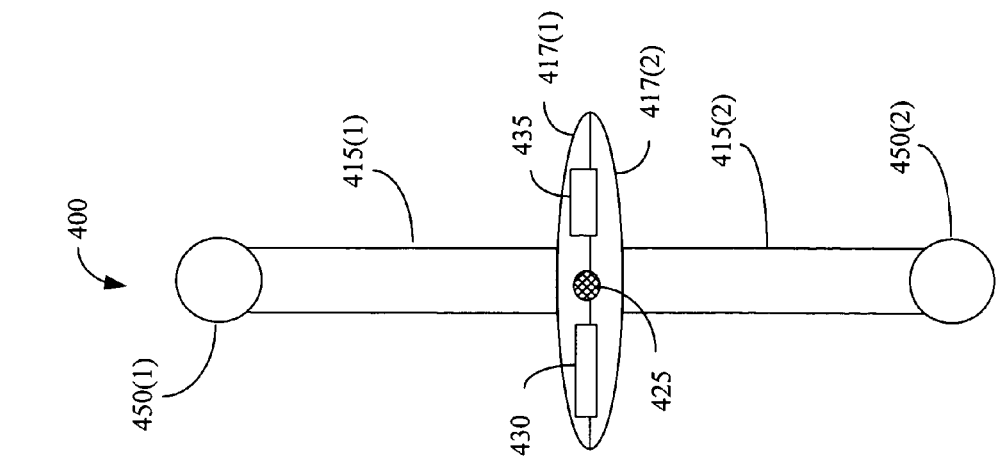
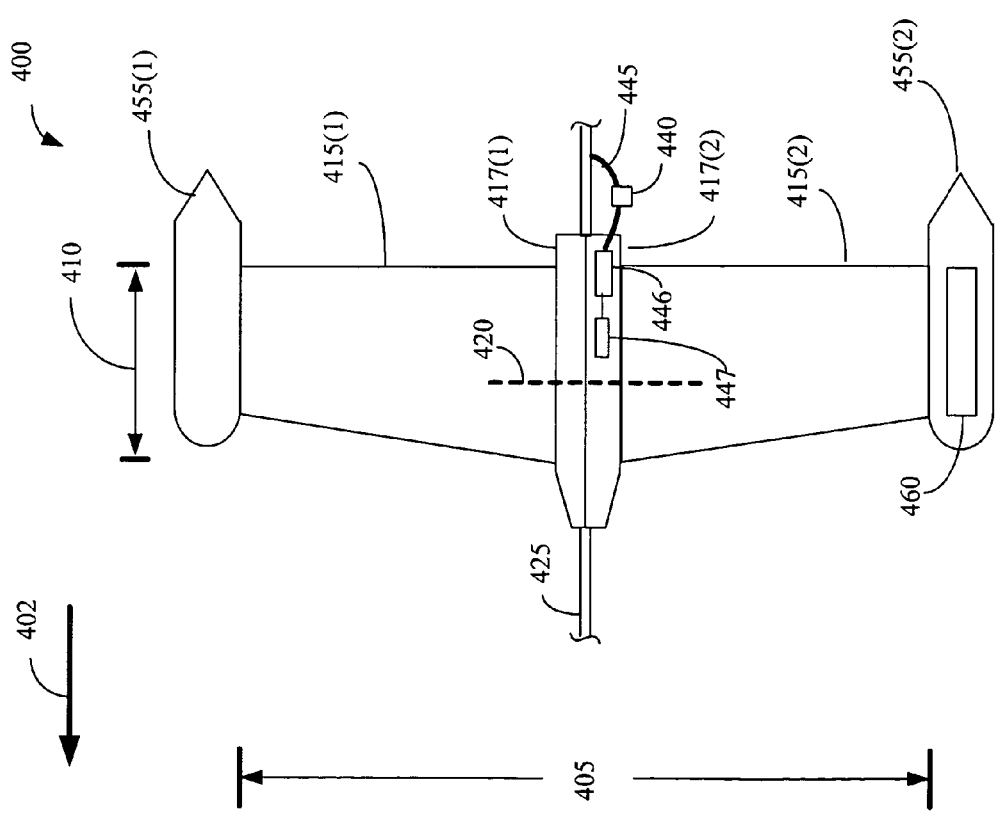

STEERABLE HYDROFOIL

BACKGROUND OF THE INVENTION

1. Field of the Invention

This invention relates generally to marine seismic exploration, and, more particularly, to a steerable hydrofoil for use in marine seismic exploration.

2. Description of the Related Art

Marine seismic exploration is widely used to locate and/or survey subterranean geological formations for hydrocarbon deposits because many hydrocarbon deposits are found beneath bodies of water. FIG. 1 conceptually illustrates a first embodiment of a conventional system 100 for carrying out a marine seismic survey. In the illustrated embodiment, one half of the conventional system 100 is shown, but it should be understood that the conventional system includes a second half above the symmetry line 102. The conventional system 100 includes a survey vessel 105 coupled to a seismic array 110, which typically includes one or more streamers 115.

The streamers 115 include passive streamer sections 117, sometimes referred to as stretches, which may be used to dampen vibrations. The passive streamer sections 117 may have a length that ranges from about 50 to 150 meters. For example, the passive streamer sections 117 may have a length between 75 and 100 meters. Typically, the streamers 115 and, if present, the passive streamer sections 117, are coupled to the survey vessel 110 by lead-in cables 120. Separation ropes 123 may also be provided to spread out the streamers 115 and, if present, the passive streamer sections 117. One or more seismic sensors 125, such as hydrophones, may be distributed along the length of the seismic streamer 115. Although not shown in FIG. 1, one or more seismic sources may also be included within the conventional system 100.

In operation, the survey vessel 105 attempts to tow the seismic array 110 along a predetermined path. As the seismic array 110 passes over a selected portion of the sea floor beneath the predetermined path, the seismic sources may be used to drive an acoustic wave, commonly referred to as a "shot," through the overlying water and into the ground. The acoustic wave is reflected by subterranean geologic formations and propagates back to the seismic sensors 125. The seismic sensors 125 receive the reflected waves, which are then processed to generate seismic data. Analysis of the seismic data may indicate probable locations of geological formations, such as hydrocarbon deposits, that may exist beneath the sea floor along the predetermined path.

The accuracy of the seismic survey is determined, in part, by how accurately the seismic array 110 is towed along the predetermined path. Thus, in addition to guiding the seismic array 110 by steering the survey vessel 105, the marine seismic surveying system 100 includes hydrofoils 130 coupled to the seismic array 110. For example, Western Geco Monowings® may be coupled to one or more of the lead-in cables 120 and/or the passive streamer sections 117 of the seismic array 110. Although two hydrofoils 130 are shown in the embodiment illustrated in FIG. 1, persons of ordinary skill in the art will appreciate that more or fewer hydrofoils 130 may be coupled to the seismic array 110. Moreover, in some alternative embodiments, the hydrofoils 130 are towed by a separate rope or wire, and are coupled to the seismic array 110 by strong separation ropes that are usually called lever arms (not shown). In these cases, hydrofoils 130 of a type usually referred to as a door, paravane, or Barovane, are typically used.

To provide sufficient lift to steer the front end of the seismic array 110 and/or to maintain a spread of the seismic cables 115 and/or the passive streamer sections 117, a typical hydrofoil 130 used in a marine seismic survey is approximately 7-10 meters tall and has a 1-2 meter chord length. In accordance with common usage in the art, the chord length of the hydrofoil 130 is defined herein as the distance from the nose to the tail of the hydrofoil 130. A hydrofoil 130 of this size may have a lift of about 10 tons.

Conventional hydrofoils 130 are typically steered passively to a desired mean position along the predetermined path, at least in part because the power required for active continuous steering of the large hydrofoils 130 is relatively large and not generally available. Passive steering of the hydrofoils 130 is typically capable of steering the seismic array 110 through a range of about 500-600 meters in the cross-line and/or in-line directions. However, variable water currents and the like along the predetermined path may cause the hydrofoil 130 to deviate from its desired mean position. Consequently, the front end of the seismic array 110 and/or the location of one or more of the streamers 115 may also deviate from their desired positions. For example, the seismic array 110 and/or the streamers 115 may deviate from their desired positions by a positioning error of about ±5-10 meters. The deviations of the seismic array 110 and/or the streamers 115 may be in either the cross-line or the in-line direction. Alternatively, when the seismic array 110 is steered to repeat the path of a previous seismic survey, then the desired path of travel may not be a straight line. Deviations from this line may cause cross-line position errors.

The positioning errors caused by the deviations of the seismic array 110 and/or the streamers 115 introduce noise into the seismic data. For example, the positioning errors may degrade the time-lapse signal-to-noise ratio of the seismic data. The positioning errors may also propagate from a front end to a back end of the seismic array 110 and/or the streamers 115 and, depending on factors such as the water currents, the positioning errors may increase from the front end to the back end of the seismic array 110 and/or the streamers 115. Furthermore, the positioning errors may propagate from one survey to another when seismic data is collected in multiple surveys that are repeated over a period of time and then combined, or stacked, to form a combined seismic data set.

Conventional hydrofoils 130, such as doors, paravanes, Barovanes, and the like are not typically used to correct for path deviations, such as those caused by current variations. For example, conventional hydrofoils 130 are typically used near their maximum lift capacity in a standard efficient tow configuration, such as shown in FIG. 1, which may limit the ability of the hydrofoil 130 to compensate for path deviations. Although the towing configuration of the one or more hydrofoils 130 may be changed so that the hydrofoils 130 operate at lower lift powers, e.g. approximately 65% of their maximum lift power, this approach would provide a less efficient configuration with longer lead-in cables 120, reduced efficiency in terms of reduced maximum spread, longer lay backs resulting in difficulties in re-positioning by vessel steering, deep cables, and other undesirable consequences. Moreover, cross-line steering of the hydrofoil 130 may introduce undesirable changes in the in-line position of the streamers 120.

FIG. 2 conceptually illustrates movement of the hydrofoil 130 described above, such as a door, a paravane, a Barovane, and the like. As an angular deviation 205 of the hydrofoil 130 increases in the direction indicated by the arrow, a drag 210 of the hydrofoil 130 and a lead-in tension 215 increase correspondingly. Consequently, a lift 220 needed to oppose the drag 210 and the lead-in tension 215 increases significantly. Achieving the required lift 220 may require increasing an angle of attack of the hydrofoil 130 into a range in which the hydrofoil 130 may stall and/or become unstable. These disadvantages may also limit the ability of the hydrofoil 130 to compensate for path deviations.

Referring back to FIG. 1, the hydrofoil 130 also creates a wake 135 of highly rotational fluid. Since the seismic array 110, the streamers 115, and the sensors 125 are towed approximately behind the hydrofoil 130, the wake 135 often disturbs the seismic array 110, the streamers 115 and/or the seismic sensors 125. Wake disturbances add noise to the seismic data. Moreover, the wake noise introduced by wake 135 of the hydrofoil 130 may be increased if the hydrofoil 130 is steered. A non-steerable, fixed angle-of-attack hydrofoil (not shown), such as Western Geco's non-steerable Miniwing® may be coupled to the front of one or more of the streamers 115 to pull the streamer 115 about 15-20 meter out of the wake 135. However, the angle-of-attack of the non-steerable, fixed angle-of-attack hydrofoil may not be changed during a survey to account for changing conditions.

One or more birds 140 may also be attached to the streamers 120. A typical bird 140 has a combined wing span of about 1 meter and has a chord length of approximately 20 centimeters. The birds 140 provide force cross-line to the streamers 115 and are typically used for depth keeping and to compensate for variable current conditions. Conventional birds are only capable of providing forces in the vertical plane for depth keeping purposes. However WesternGeco birds, called Q-fins®, are capable of providing cross line forces in both the vertical plane, for depth keeping, and in the horizontal plane. The latter is used for keeping a straight streamer in spite of varying currents, keeping constant streamer separation and to steer sideways in order to achieve a given demanded feather. The birds 140 may also be steerable. However, due at least in part to high tension in the streamers 115, the passive streamer sections 117, the stretches 123, and the lead-in cables 120, the steerable birds 140 are typically not powerful enough, i.e. they do not provide sufficient lift, to help position the front end of the streamers 115 and/or the array 110. For example, several hundred meters and several steerable birds 140 may be required to achieve a desired position for the streamers 115 and/or the array 110. Moreover, such hard steering of the steerable birds 140 may also increase noise in the seismic data and limit the steerable birds 140 ability to compensate for varying current conditions and/or to steer the seismic array 110 out of the wake 135 of the hydrofoil 130.

In summary, due in part to constraints such as cost, power consumption, noise levels, and desired function of existing elements, the conventional marine seismic survey system 100 lacks a mechanism for maneuvering the front end of the seismic array 110 and/or streamers 115 within a relatively small range of ±20 meters in the cross-line direction. The conventional marine seismic survey system 100 also lacks a mechanism for reliably positioning the front end of the seismic array 110 and/or streamers 120 with an error of less than or about ±1 meter. Consequently, undesirable noise, e.g. noise from excess steering of the hydrofoils 135 and/or the steerable birds 140, noise from positioning errors, and/or noise from the wake 135 of the hydrofoil 130, may be introduced into seismic data collected by the conventional marine seismic survey system 100.

The present invention is intended to address one or more of the problems discussed above.

SUMMARY OF THE INVENTION

In one embodiment of the instant invention, a steerable hydrofoil is provided. The apparatus includes at least one steerable hydrofoil panel, at least one body part coupled to the at least one steerable hydrofoil panel to allow the at least one steerable hydrofoil panel to rotate about an axis, and at least one actuator for rotating the at least one steerable hydrofoil panel by a selected angle about the axis.

In another embodiment of the instant invention, a method is provided. The method includes deploying at least one steerable hydrofoil panel such that the steerable hydrofoil is rotatable about an axis during a marine seismic survey and rotating the at least one steerable hydrofoil panel about the axis by a selected angle during operation of the marine seismic survey.

In another embodiment of the instant invention, a system is provided. The system includes a survey vessel, at least one seismic streamer coupled to the survey vessel, and at least one hydrofoil coupled to the at least one seismic streamer. The system also includes at least one steerable hydrofoil panel coupled to the at least one seismic streamer, at least one body part coupled to the at least one steerable hydrofoil panel to allow the at least one steerable hydrofoil panel to rotate about an axis, and at least one actuator for rotating the at least one steerable hydrofoil panel by a selected angle about the axis.

BRIEF DESCRIPTION OF THE DRAWINGS

The invention may be understood by reference to the following description taken in conjunction with the accompanying drawings, in which like reference numerals identify like elements, and in which:

FIG. 4A conceptually illustrates one exemplary embodiment of a steerable hydrofoil that may be used in the marine seismic surveying system shown in FIG. 3A;

FIG. 4B conceptually illustrates a plan view of the steerable hydrofoil shown in FIG. 4A;

Figure 1:
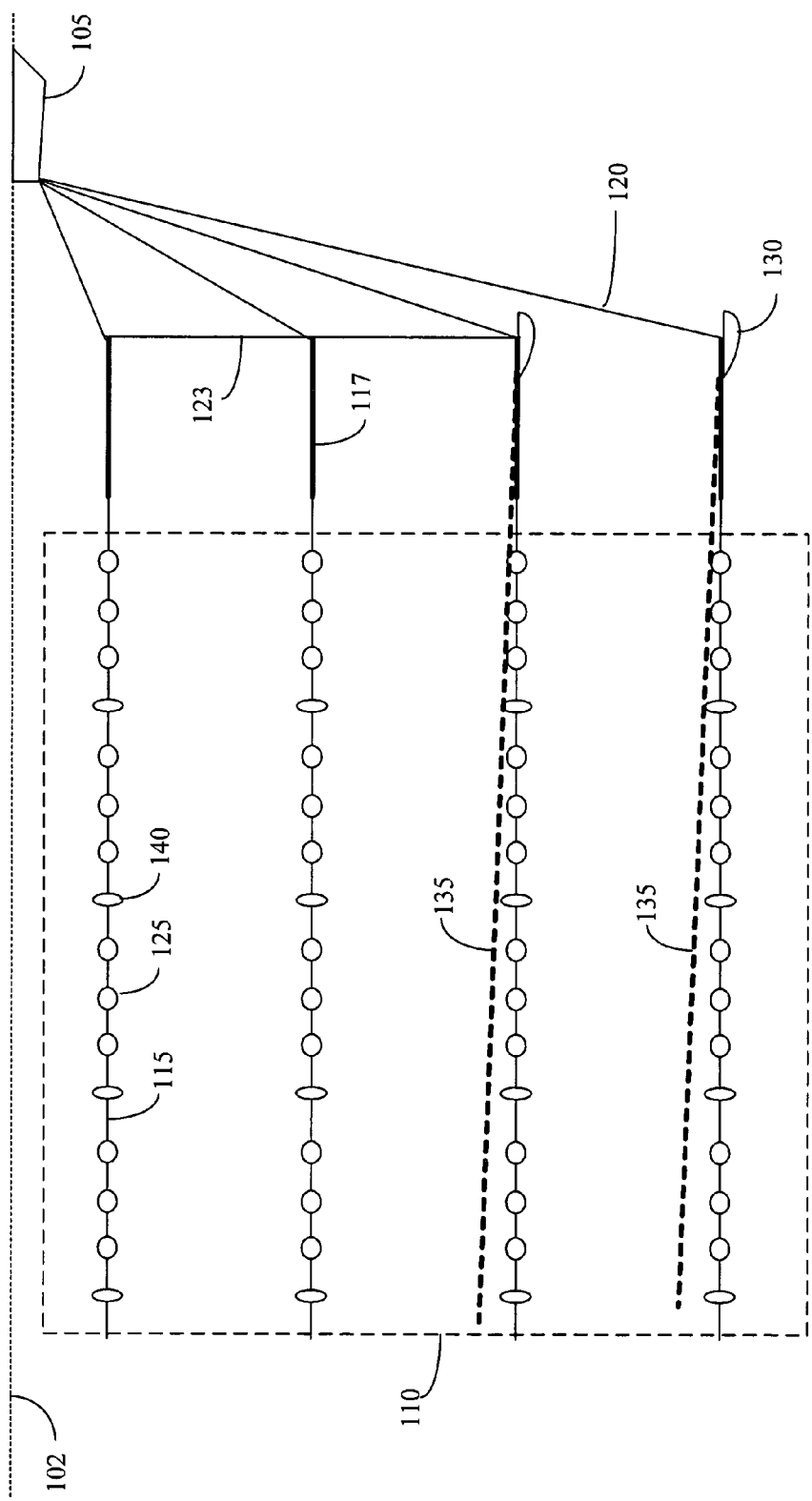
FIG. 1 conceptually illustrates a first embodiment of a prior art system for carrying out a marine seismic survey.
Figure 2:
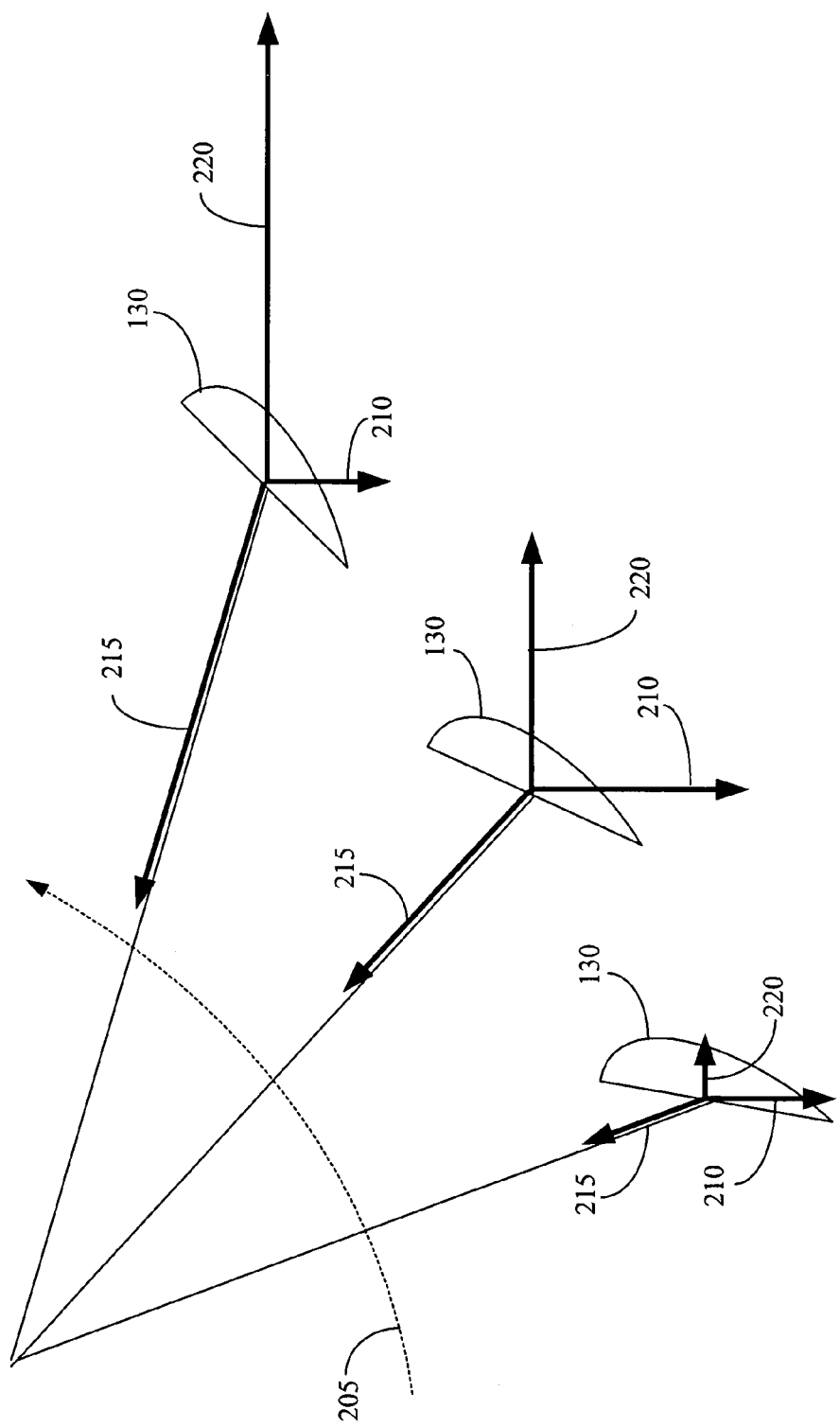
FIG. 2 conceptually illustrates motion of a hydrofoil that may be used in the system shown in FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
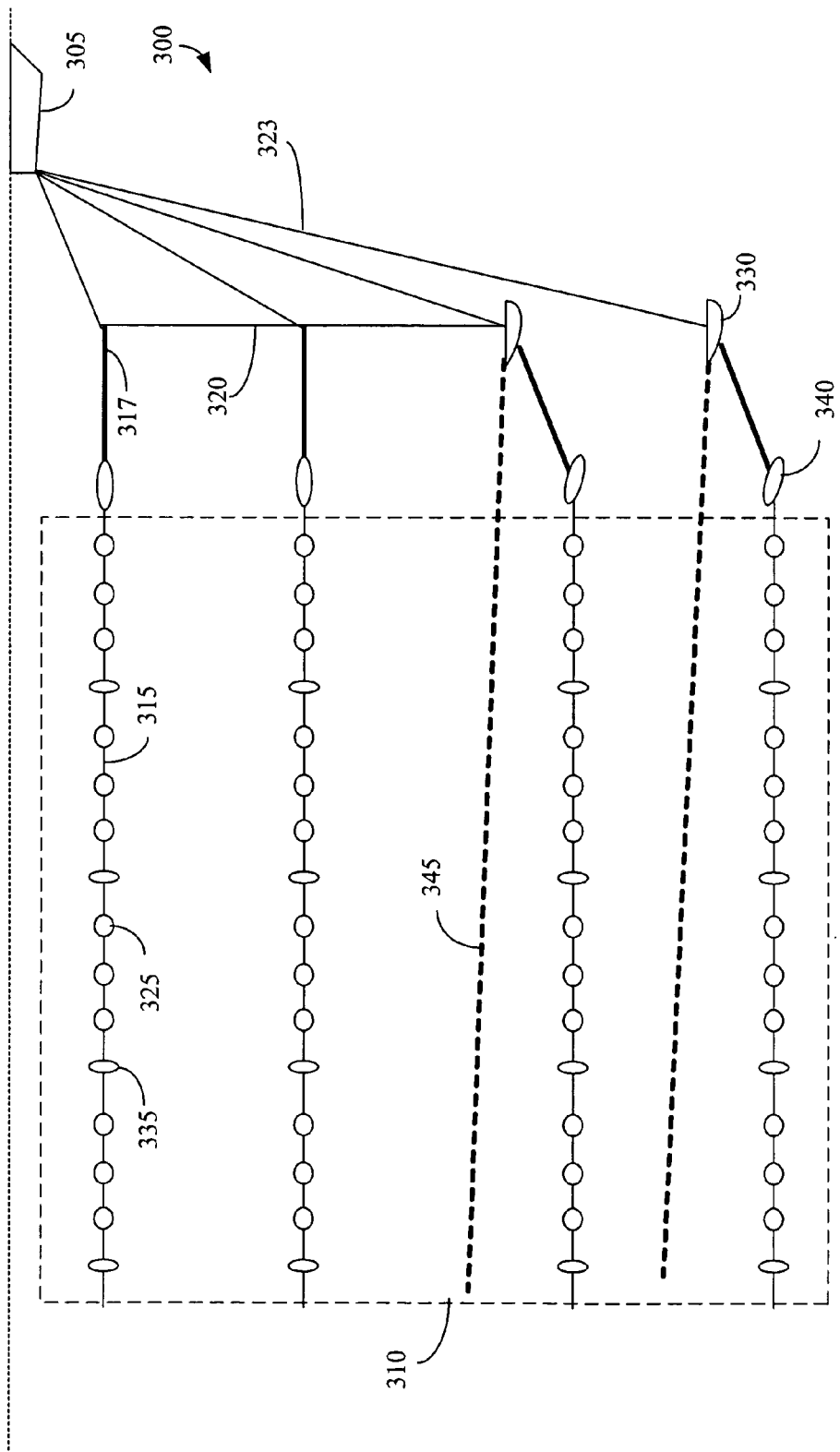
FIG. 3 conceptually illustrates one embodiment of a marine seismic surveying system.

FIG. 3 conceptually illustrates one embodiment of a marine seismic surveying system 300. The marine seismic surveying system 300 may be employed in systems intended for use in aquatic environments, i.e., fresh, salt, or brackish water. As will be appreciated by those skilled in the art, such surveys are frequently referred to as "marine surveys" even if performed in fresh or brackish waters. The term is so used herein.

The marine seismic survey system 300 includes a survey vessel 305 coupled to a seismic array 310, which typically include one or more streamers 315 (only one indicated by the reference number). As discussed in detail above, the seismic array 310 may also include one or more passive streamer sections 317 (only one indicated by the reference number), one or more separation ropes 320 (only one indicated by the reference number), and one or more lead-in cables 323 (only one indicated by the reference number). One or more seismic sensors 325 (only one indicated by the reference number), such as hydrophones, may be distributed along the length of the seismic streamer 315. One or more hydrofoils 330, such as Western Geco's Monowing®, may be coupled to a front end of the seismic array 310 and one or more birds 335 may be coupled to the streamers 315. Persons of ordinary skill in the art should appreciate that one or more of the passive streamer sections 317 may, in alternative embodiments, be replaced by active streamers 315. These aspects of the marine seismic survey are implemented and operated in well-known, conventional fashion. Thus, in the interest of clarity, the operation of these known devices will not be discussed further herein.

One or more steerable hydrofoils 340 (not all indicated) are coupled to the seismic array 310 between the seismic array 310 and the hydrofoil 330. The steerable hydrofoils 340 have a predetermined height between about 1.5 meters and about 4 meters, and a predetermined chord length between about 40 centimeters and about 100 centimeters. In the illustrated embodiment, the steerable hydrofoils 340 are coupled to the passive streamer section 317. However, the present invention is not limited to steerable hydrofoils 340 that are coupled to the passive streamer section 317. In one alternative embodiment, which may be implemented in addition to or instead of the aforementioned embodiment, one or more of the steerable hydrofoils 340 may be coupled to one or more of the separation ropes 320 at the front of the seismic array 310. In another alternative embodiment, which may be implemented in addition to or instead of the aforementioned alternative embodiments, each of a plurality of steerable hydrofoils 340 may be coupled to a front end of one of the plurality of seismic streamers 315.

However, the present invention is not limited to having the steerable hydrofoils 340 coupled to one or more of the separation ropes 320 and/or the plurality of seismic streamers 315. Nor is the number of steerable hydrofoils 340 material to the practice of the present invention. In alternative embodiments, more or fewer steerable hydrofoils 340 may be coupled to the seismic array 110 at any desirable location. For example, a plurality of steerable hydrofoils may be coupled to each seismic streamer 315 at locations distributed along the seismic streamer 315.

In operation, the steerable hydrofoils 340 may be oriented to provide a selected angle of attack. For example, the steerable hydrofoils 340 may be oriented at one of a predetermined plurality of angles of attack. For another example, the steerable hydrofoils 340 may be oriented at an angle of attack within a predetermined range of angles of attack. In one embodiment, the steerable hydrofoils 340 may all be oriented at the same angle of attack. However, the present invention is not limited to steerable hydrofoils 340 that are all oriented at the same angle of attack. In alternative embodiments, one or more of the steerable hydrofoils 340 may be independently oriented at different angles of attack.

The lift provided by the steerable hydrofoil 340 is approximately proportional to the angle of attack. The steerable hydrofoil 340 may be able to steer at least a portion of the streamers 315 and/or the seismic array 310 through a range of approximately ±20 meters in a cross-line direction. However, persons of ordinary skill in the art should appreciate that the precise steering range of the steerable hydrofoils 340 is a matter of design choice and may also depend on environmental conditions such as water currents and knowledge thereof, the speed of the survey vessel 305, the size of the seismic array 310, the software controlling the steering elements, and the like. In one embodiment, the steerable hydrofoil 340 deployed proximate a front end of the seismic streamer 315 may be able to position the front end of the seismic streamer 315 within an error of ±1 meter. In one embodiment, the steerable hydrofoil 340 may be operated in a zero-lift configuration, as will be discussed in detail below.

By providing the one or more steerable hydrofoils 340, the streamers 315 and/or seismic sensors 325 may be steered such that the influence of a wake 345 formed by the hydrofoil 330 on the streamers 315 and/or the seismic sensors 325 may be reduced, which may reduce the amount of noise in the seismic data. In one embodiment, to steerable hydrofoils 340 may provide horizontal leverage of about 15-20 meters and therefore may be steered such that the streamers 315 and/or the seismic sensors 325 are not in the wake 345. However, persons of ordinary skill in the art should appreciate that the wake noise may be reduced even if a portion of the streamers 315 and/or the seismic sensors 325 remain in the wake 345. Moreover, persons of ordinary skill in the art should appreciate that the boundaries of the wake 345 may vary, and consequently the portion of the streamers 315 and/or the seismic sensors 325 that are inside the wake 345 may vary, in response to changes in the velocity of the survey vessel 305, water currents, and the like.

The steerable hydrofoils 340 may also be steered to compensate for current variability, and/or for the purpose of positioning the array 310 on a track that may or may not be straight. Consequently, it may not be necessary to steer the hydrofoil 330, which may reduce the steering noise produced by the hydrofoil 330, reduce the power requirements on the hydrofoil 330, and/or allow the hydrofoil 330 to be operated near its maximum lift capacity. Furthermore, the amount of hard steering of the steerable birds 335 may be reduced, which may reduce noise in the seismic data. Moreover, the steerable hydrofoil 340 may be actively positioned during the marine seismic survey, which may allow more accurate positioning of the seismic array 310, the seismic streamers 315, and/or the seismic sensors 325.

FIG. 4A conceptually illustrates one exemplary embodiment of a steerable hydrofoil 400. In operation, the steerable hydrofoil 400 is towed in a direction indicated by the arrow 402. In the illustrated embodiment, the steerable hydrofoil 400 has a height 405 of about 2 meters and a chord length 410 of about 60 centimeters. As discussed above, in alternative embodiments, the steerable hydrofoil 400 may have a height 400 ranging between about 1.5 meters and about 4 meters and a chord length 410 ranging between about 40 centimeters and about 100 centimeters. In the illustrated embodiment, the steerable hydrofoil 400 includes an upper panel 415(1) and a lower panel 415(2). However, in alternative embodiments, the steerable hydrofoil 400 may include more or fewer panels. For example, the steerable hydrofoil 400 may be formed of a single panel.

The upper panel 415(1) and the lower panel 415(2) of the steerable hydrofoil 400 are mounted onto an upper and a lower body part 417(1-2), respectively. In one embodiment, the upper and lower panels 415(1-2) are mounted in a manner that allows the upper panel 415(1) and the lower panel 415(2) to rotate about an axis 420. For example, the upper and lower panels 415(1-2) may be rigidly coupled so that they rotate together about the axis 420. For another example, the upper and lower panels 415(1-2) may rotate independently about the axis 420. However, in alternative embodiments, the upper and lower panels 415(1-2) are rigidly connected to the upper and lower body parts 417(1-2) and the upper and lower body parts 417(1-2) may be rotated about a virtual axis 420. The upper and lower body parts 417(1-2) are coupled to a streamer 425. In alternative embodiments, the upper and lower body parts 417(1-2) may be hinged, bolted, or coupled to the streamer 425 in any other desirable manner.

FIG. 4B conceptually illustrates a plan view of the steerable hydrofoil 400 as seen from the direction indicated by the arrow 402. An actuator 430 is deployed in the body 417(1-2) and provides a motive force to rotate the upper and/or lower panels 415(1-2) about the axis 420. In various alternative embodiments, the actuator 430 may be an electrical, hydraulic, or pneumatic actuator 430 that provides the motive force. In one embodiment, a position sensor 435 is provided to determine the position angle. In one embodiment, the actuator 430 may receive one or more signals indicative of the selected rotation angle 435 and may use the received signal to rotate the upper and/or lower panels 415(1-2) to the selected rotation angle 435. For example, the actuator 430 and/or the position sensor 435 may receive and/or transmit signals through the streamer 425 (and associated electronics) using a connector 440 and a cable 445, such as shown in FIG. 4A.

The steerable hydrofoil 400 may also include a controller unit 446. In one embodiment, the controller unit 446 controls the actuator 430 and reads position information from the position sensor 435. The controller unit 446 may also provide data to, and receive data and/or instructions from, a computer onboard the vessel through the cable 445. A battery unit 447 may be used to supply power to the actuator 430 the position sensor 435, the controller unit 446, and any other element of the steerable hydrofoil 400 that may require power.

Figure 4C:
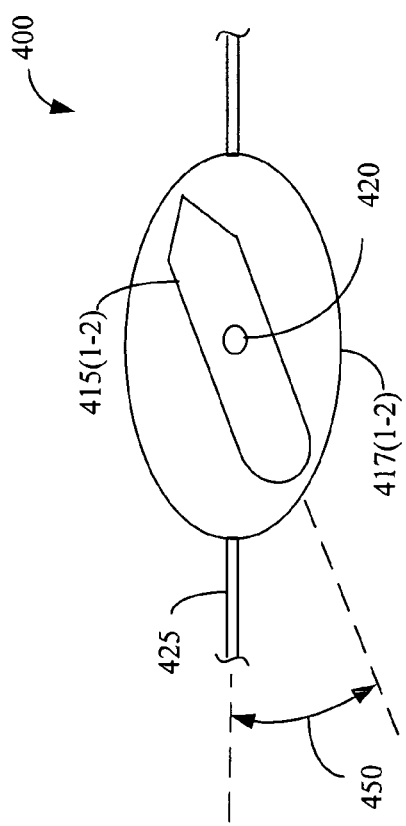
FIG. 4C conceptually illustrates a top-down view of one embodiment of the steerable hydrofoil shown in FIG. 4A.

FIG. 4C conceptually illustrates a top-down view of one embodiment of the steerable hydrofoil 400. In the illustrated embodiment, the upper and/or lower panels 415(1-2) are rotated about the axis 420 by a rotation angle 450. The rotation of the upper and/or lower panels 415(1-2) in FIG. 4C is relative to the streamer 420 and the upper and lower body parts 417(1-2).

Figure 4D:
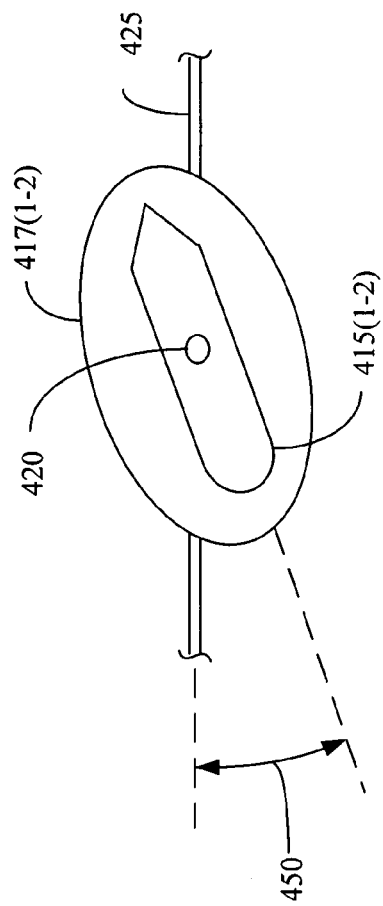
FIG. 4D conceptually illustrates a top-down view of one alternative embodiment of the steerable hydrofoil shown in FIG. 4A.

FIG. 4D conceptually illustrates a top-down view of one alternative embodiment of the steerable hydrofoil 400 in which the upper and lower body parts 417(1-2) also rotate relative to the streamer 420. In the illustrated embodiment, the upper and/or lower panels 415(1-2) are rotated about the axis 420 by the rotation angle 450. The rotation of the upper and/or lower panels 415(1-2) in FIG. 4D is relative to the streamer 420. In one embodiment, the panels 415(1-2) are fixed to the upper and lower body parts 417(1-2) and the angle of attack may be varied by rotating the upper and lower body parts 417(1-2), and consequently the wing panels 415(1-2), relative to the streamer 420. However, the present invention is not so limited. In alternative embodiments, the wing panels 415(1-2) and/or the upper and lower body parts 417(1-2) may be able to rotate relative to the streamer 420.

By selecting the appropriate rotation angle 450, the upper and/or lower panels 415(1-2) may be oriented to provide a desired angle of attack. In one embodiment, the rotation angle 450 may be selected and/or varied to vary the angle of attack during the operation of a marine seismic survey. Consequently, the steerable hydrofoil 400 may be used as part of an active positioning system that may be employed during a marine seismic survey.

Referring back to FIG. 4A, one or more bulbs 455(1-2) may also be provided at ends of the upper and/or lower panels 415(1-2). In one embodiment, the bulbs 455(1-2) may be rotational bodies, torpedo bodies, and the like. The bulb 455(1) may be formed of a buoyant material and the bulb 455(2) may be formed of a heavy material so that the steerable hydrofoil 400 stands approximately upright during operation and is approximately neutrally buoyant. For example, the bulb 455(2) may include a weight 460 formed of a heavy material such as lead.

Figure 5:
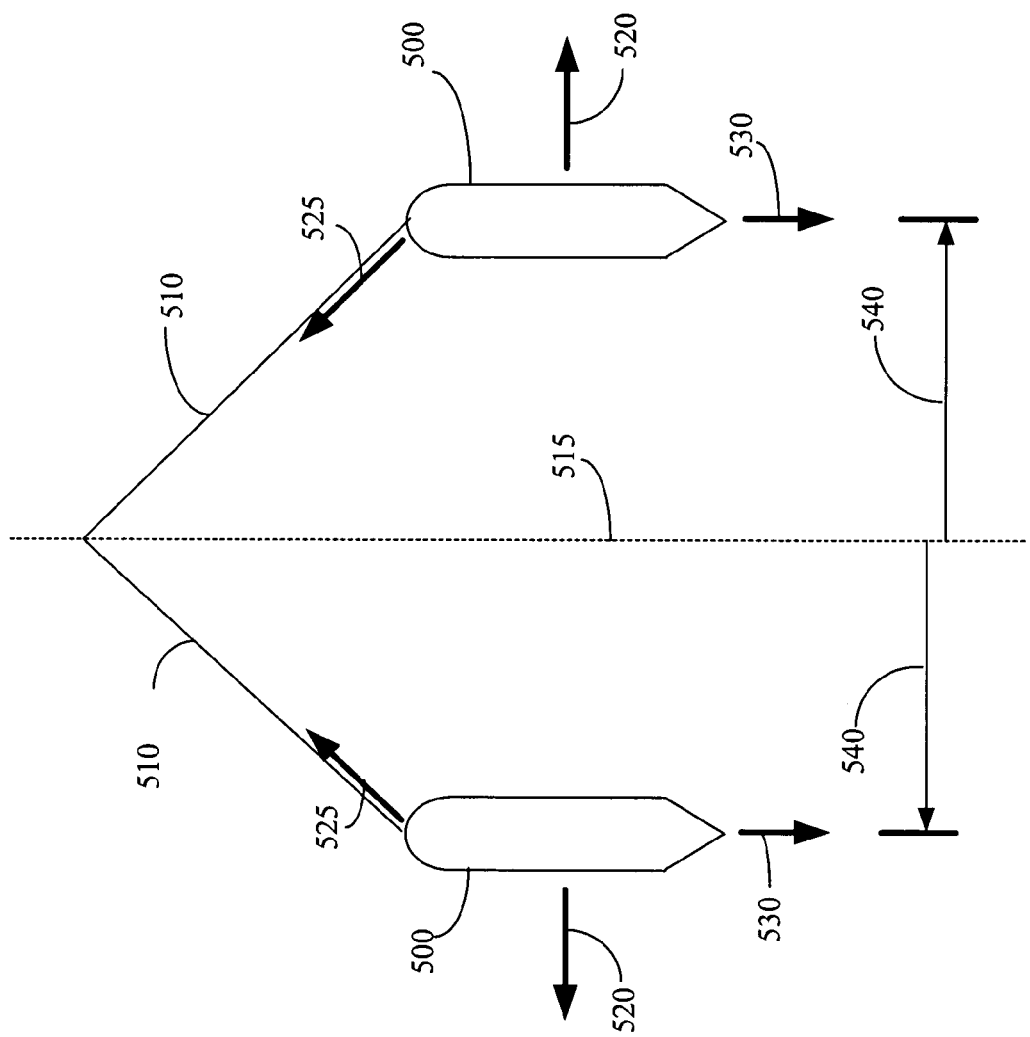
FIG. 5 conceptually illustrates motion of a steerable hydrofoil shown in FIGS. 4A-4D, which may be used in the system shown in FIG. 3.

FIG. 5 conceptually illustrates motion of a steerable hydrofoil 500 that may be used in the system 300 shown in FIG. 3. The steerable hydrofoil 500 is coupled to the streamer 510 and may be operated in a zero-lift configuration indicated by the dashed line 515. The steerable hydrofoil 500 is designed with a symmetrical profile shape and therefore may provide a lift 520 equally well in both directions. Moreover, the lift 520 opposes approximately the same tension 525 and drag 530 in both directions. The steerable hydrofoil 500 may therefore move through a relatively large cross-line distance 540 using a relatively small range of lifts 520. For example, the lift 520 required to maneuver the steerable hydrofoil 500 through the cross-line distance 540 may be significantly smaller than the lift that would be required to maneuver the hydrofoil 330 shown in FIG. 3 through the cross-line distance 540, particularly if the hydrofoil 330 is operated in a maximum lift configuration.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for marine seismic survey, comprising:
   at least one first steerable hydrofoil towed by a seismic vessel during a seismic survey;
   at least one second steerable hydrofoil coupled to the at least one first steerable hydrofoil, the second steerable hydrofoil trailing the first steerable hydrofoil during the seismic survey; and
   a leading end of at least one streamer coupled to and trailing behind the at least one second steerable hydrofoil wherein the streamer comprises a plurality of seismic sensors and a plurality of birds,
   wherein the first and second steerable hydrofoils are both actively steerable during the seismic survey.

2. The apparatus of claim 1, wherein the at least one second actively steerable hydrofoil comprises one or more actively steerable hydrofoil panels, and the one or more actively steerable hydrofoil panels have a combined height between about 1.5 meters and about 4 meters and the one or more actively steerable hydrofoil panels have a chord length ranging from about 40 centimeters to about 100 centimeters.

3. The apparatus of claim 2, wherein the one or more actively steerable hydrofoil panels have a combined height of about 2 meters.

4. The apparatus of claim 2, wherein the one or more actively steerable hydrofoil panel has a chord length of about 60 centimeters.

5. The apparatus of claim 2, wherein the one or more actively steerable hydrofoil panel comprises two steerable hydrofoil panels coupled to at least one body part configured to be coupled to a streamer.

6. The apparatus of claim 1, wherein the second steerable hydrofoil comprises at least one bulb.

7. The apparatus of claim 6, wherein the at least one bulb comprises a bulb of heavy material.

8. The apparatus of claim 7, wherein the at least one bulb comprises a bulb of buoyant material.

9. The apparatus of claim 8, wherein the bulb of heavy material and the bulb of buoyant material are coupled to opposite ends of the at least one steerable hydrofoil panel.

10. The apparatus of claim 9, wherein the bulb of heavy material and the bulb of buoyant material are selected such that the steerable hydrofoil panels, the at least one body part, and the bulbs are together neutrally buoyant.

11. The apparatus of claim 1, wherein the second steerable hydrofoil comprises an actuator, and wherein the actuator is at least one of an electrical, a hydraulic, and a pneumatic actuator.

12. The apparatus of claim 1, wherein the second steerable hydrofoil comprises at least one steerable hydrofoil panel, a controller unit, a battery, and at least one position sensor configured to determine an angle of the steerable hydrofoil panel.

13. The apparatus of claim 1, wherein the second actively steerable hydrofoil is smaller than the first actively steerable hydrofoil and larger than the birds.

14. A method for marine seismic survey, comprising:
deploying at least one first actively steerable hydrofoil towed by a seismic vessel;
deploying at least one second actively steerable hydrofoil coupled to and trailing behind the at least one first actively steerable hydrofoil;
deploying at least one streamer coupled at its leading end to the at least one second actively steerable hydrofoil wherein the streamer comprises a plurality of seismic sensors and a plurality of birds; and
steering the second actively steerable hydrofoil such that the influence of a wake formed by the first actively steerable hydrofoil on the streamers is reduced, to compensate for current variability, and to position the streamers on a track that may or may not be straight;
wherein the steering comprises actively steering the first and second actively steerable hydrofoils during a marine seismic survey.

15. The method of claim 14, wherein the second steerable hydrofoil comprises at least one steerable hydrofoil panel such that the combined height of the one or more steerable hydrofoil panels ranges from about 1.5 meters to about 4 meters and a chord length of the one or more steerable hydrofoil panels ranges from about 40 centimeters to about 100 centimeters 16. The method of claim 15, further comprising: rotating at least one steerable hydrofoil in the second steerable hydrofoil, wherein rotating the at least one steerable hydrofoil comprises rotating at least one steerable hydrofoil panel to position the seismic streamer.

17. The method of claim 16, wherein rotating the at least one steerable hydrofoil panel to position at least one of the seismic streamer comprises rotating the at least one steerable hydrofoil panel to vary the position of at least one of the seismic array and the seismic streamer within a range of about ±20 meter.

18. The method of claim 16, wherein rotating the at least one steerable hydrofoil panel to position at least one of the seismic streamer comprises rotating the at least one steerable hydrofoil panel to position at least one of the seismic streamer within an error of about ±1 meter.

19. The method of claim 14, wherein the at least one first steerable hydrofoil is a large steerable hydrofoil and the at least one second steerable hydrofoil is smaller than the large steerable hydrofoil.

20. A method for marine seismic survey, comprising:
deploying at least one first actively steerable hydrofoil towed by a seismic vessel;
deploying at least one second actively steerable hydrofoil coupled to and behind the at least one first actively steerable hydrofoil, wherein the second actively steerable hydrofoil comprises at least one actively steerable hydrofoil panel rotatable about an axis during a marine seismic survey;
deploying at least one streamer coupled at its leading end to the at least one second actively steerable hydrofoil wherein the streamer comprises a plurality of seismic sensors and a plurality of birds;
orienting the at least one actively steerable hydrofoil panel about the axis to provide a selected angle of attack; and
steering the second actively steerable hydrofoil such that the influence of a wake formed by the first actively steerable hydrofoil on the streamers is reduced, to compensate for current variability, and to position the streamers on a track that may or may not be straight;
wherein the steering comprises actively steering the first and second actively steerable hydrofoils during a marine seismic survey.

21. The method of claim 20 wherein the orienting the at least one steerable hydrofoil panel about the axis to provide a selected angle of attack comprises selecting an angle of attack from one of a predetermined plurality of angles of attack.

22. The method of claim 20 wherein the orienting the at least one steerable hydrofoil panel about the axis to provide a selected angle of attack comprises selecting an angle of attack that is within a predetermined range of angles of attack.

23. The method of claim 20 wherein the deploying at least one steerable hydrofoil panel comprises deploying a plurality of steerable hydrofoil panels, and the selected angle of attack is the same for each steerable hydrofoil panel.

24. The method of claim 20 wherein the deploying at least one steerable hydrofoil panel comprises deploying a plurality of steerable hydrofoil panels, and the selected angle of attack is different for each steerable hydrofoil.

25. The method of claim 20 wherein the deploying at least one steerable hydrofoil panel comprises deploying a plurality of steerable hydrofoil panels, and the selected angle of attack for each hydrofoil is within a predetermined range of angles of attack.

26. The method of claim 25 wherein the deploying a plurality of steerable hydrofoil panels comprises deploying two or more steerable hydrofoil panels independently within the predetermined range of angles of attack.

27. The method of claim 20, wherein the at least one first steerable hydrofoil is a large steerable hydrofoil and the at least one second steerable hydrofoil is smaller than the large steerable hydrofoil.

28. A method, comprising:
deploying a survey vessel, at least one seismic streamer coupled to the survey vessel, the seismic streamer having a front end and a tail end, at least one hydrofoil coupled to the at least one seismic streamer near the front end of the at least one streamer, the hydrofoil producing a wake, and at least one actively steerable hydrofoil panel coupled to the at least one seismic streamer and trailing behind the hydrofoil; and
actively steering the at least one streamer during a marine seismic survey using the at least one actively steerable hydrofoil panel so that at least a portion of the streamer is steered out of the wake.

29. The method of claim 28 wherein the steering the at least one streamer using at least one steerable hydrofoil panel comprises horizontally leveraging the at least one streamer a distance ranging from about 15 to about 20 meters.

30. The method of claim 28 wherein the steering the at least one streamer using at least one steerable hydrofoil panel comprises varying an amount of the at least one streamer in the wake.

31. The method of claim 28 wherein the steering the at least one streamer using at least one steerable hydrofoil panel comprises compensating for current variability.

32. The method of claim 28 wherein the steering the at least one streamer using at least one steerable hydrofoil panel comprises positioning the at least one streamer on a track that may or may not be straight.

33. The method of claim 28 wherein the steering of the at least one streamer using the at least one steerable hydrofoil panel comprises reducing a need for steering, reducing power requirement, and/or operating the at least one hydrofoil near its maximum lift capacity.

34. The method of claim 28 wherein the steering of the at least one streamer using the at least one steerable hydrofoil panel comprises reducing steering of any steerable birds of the streamer.

35. The method of claim 28, wherein the at least one hydrofoil is a large hydrofoil and the at least one steerable hydrofoil panel is smaller than the large hydrofoil.

* * * * *